United States Patent [19]
Gaulke et al.

[11] Patent Number: 5,737,707
[45] Date of Patent: Apr. 7, 1998

[54] PAGER-CONTROLLED WIRELESS RADIOTELEPHONE

[75] Inventors: David Alan Gaulke; Thomas Charles Hanson, both of Boulder; Richard Paul Moleres, Louisville, all of Colo.

[73] Assignee: AT&T Corp., Middletown, N.J.

[21] Appl. No.: 584,417

[22] Filed: Jan. 11, 1996

[51] Int. Cl.⁶ .................................................. H04B 1/38
[52] U.S. Cl. ........................... 455/556; 455/574; 455/426
[58] Field of Search ........................ 379/58, 59; 455/343, 455/127, 33.1, 426, 574, 573, 572, 556

[56] References Cited

U.S. PATENT DOCUMENTS

| | | | |
|---|---|---|---|
| 4,449,248 | 5/1984 | Leslie et al. | 455/574 |
| 4,922,518 | 5/1990 | Gordon et al. | 455/31.2 |
| 5,054,052 | 10/1991 | Nonami | 455/574 |
| 5,117,449 | 5/1992 | Metroka et al. | 455/552 |
| 5,148,473 | 9/1992 | Freeland et al. | 455/556 |
| 5,153,903 | 10/1992 | Eastmond et al. | 455/458 |
| 5,175,758 | 12/1992 | Levanto et al. | 455/458 |
| 5,201,067 | 4/1993 | Grube et al. | 455/556 |
| 5,202,912 | 4/1993 | Breeden et al. | 455/465 |
| 5,247,700 | 9/1993 | Wohl et al. | 455/552 |
| 5,311,570 | 5/1994 | Grimes et al. | 455/417 |
| 5,398,280 | 3/1995 | MacConnell | 379/93.25 |
| 5,414,750 | 5/1995 | Bhagat et al. | 455/414 |
| 5,438,701 | 8/1995 | Yamada et al. | 455/574 |
| 5,526,398 | 6/1996 | Okada et al. | 455/426 |
| 5,541,976 | 7/1996 | Ghisler | 455/426 |
| 5,590,396 | 12/1996 | Henry | 455/426 |

OTHER PUBLICATIONS

S. Warren, "Wireless Computer Telephony", *Computer Telephony*, vol. 3, Issue 9 (Sep. 1995), pp. 70–79.

*Primary Examiner*—Dwayne Bost
*Assistant Examiner*—Myron K. Wyche

[57] ABSTRACT

An integrated pager and cellular phone (123) includes circuitry (502, 515) that responds to receipt by the pager (122) of an incoming-call-indicative paging signal by connecting the cellular phone (121) to a battery power source (513). This activates the cellular phone, whereupon it registers with a base station (107–109) and thus becomes able to receive the incoming call. The circuitry further responds to receipt by the pager of a second paging signal by disconnecting the cellular phone from the battery power source. This allows the cellular phone to be kept in a deactivated condition and not draining battery power at times when the cellular phone is not in use, without missing incoming calls, and does so automatically, without intervention of the user of the cellular phone.

8 Claims, 5 Drawing Sheets

PAGER-CONTROLLED WIRELESS RADIOTELEPHONE

CROSS-REFERENCE TO RELATED APPLICATION

This application relates in subject matter to application of Gaulke et al. entitled "Automated Wireless-Call Completion Using a Paging Network", filed on even date herewith and assigned to the same assignee.

TECHNICAL FIELD

This invention relates to paging and wireless radiotelephone services and equipment.

BACKGROUND OF THE INVENTION

Both paging systems and wireless radiotelephone systems are well known in the art. Paging systems are typically one-way radio communications systems that transmit rather powerful signals from a paging exchange to cover a large geographical area—such as an entire state or region, for example—with the broadcast in order to alert a person possessing a pager anywhere in that geographical area and to send a short message, such as a call request or a telephone number, to the pager's display. In contrast, wireless (e.g., cellular) radiotelephone systems are two-way radio communications systems that transmit rather weak signals at different frequencies from a plurality of base stations to cover a small area—a cell—around each base station with the transmissions. A mobile wireless radiotelephone communicates with the base station of whatever cell it happens presently to be located in via like rather weak signal transmissions to receive and to originate wireless telephone calls. In traditional cellular systems, each base station constantly engages all cellular telephones in its cell in specific two-way communications, called "registration", whereby the present location of any cellular phone is determined and incoming calls for that cellular phone can be directed by the cellular exchange to the base station that is presently serving that cellular phone.

Many users of cellular phones have continued to use pagers, which has led some manufacturers to combine both devices into a single unit. Illustrative examples thereof are disclosed in U.S. Pat. Nos. 5,117,449, 5,148,473, 5,153,903, and 5,247,700.

Because of the continuous two-way transmissions involved in registration, both the transmitter and the receiver of a turned-on wireless radiotelephone are active and consuming energy. Quite often, wireless radiotelephones operate on battery-supplied energy, and the transmitter drains significant amounts of energy from the battery. Many users of battery-powered wireless radiotelephones turn on their wireless radiotelephones only when making outgoing calls, in order to conserve battery life. And quite often, users simply forget to turn their wireless radiotelephones on. Consequently, it happens all too often that a user of a wireless radiotelephone misses incoming calls because the user's wireless radiotelephone is turned off and the exchange cannot complete the incoming calls to the wireless radiotelephone. In contrast, pagers have no transmitter (or at least no constantly-active transmitter) to drain their batteries of power, and their receivers consume only small amounts of power. Consequently, users typically keep their pagers turned on all of the time.

SUMMARY OF THE INVENTION

This invention is directed to solving this problem of the prior-art wireless radiotelephone systems. Generally according to the invention, there is provided an integrated pager and wireless radiotelephone which are interconnected such that the pager enables, or activates (e.g., turns on by causing power to be supplied to) the wireless radiotelephone in response to receipt of a paging signal. Preferably, the pager also disables or deactivates the wireless radiotelephone in response to receipt of another paging signal. Consequently, the wireless radiotelephone can be enabled or activated whenever there is an incoming call for the wireless radiotelephone, simply by sending to the pager a paging signal indicative of the incoming call. This allows the wireless radiotelephone to be kept in a disabled, deactivated, condition and not draining battery power at the times when the wireless radiotelephone is not in use, without missing incoming calls. Moreover, it has the advantage of activating and preferably also deactivating the wireless radiotelephone automatically, without intervention of the user of the pager and the wireless radiotelephone.

These and other advantages and features of the invention will become more apparent from the following description of an illustrative embodiment of the invention, taken together with the drawing.

DETAILED DESCRIPTION

Figure 1:
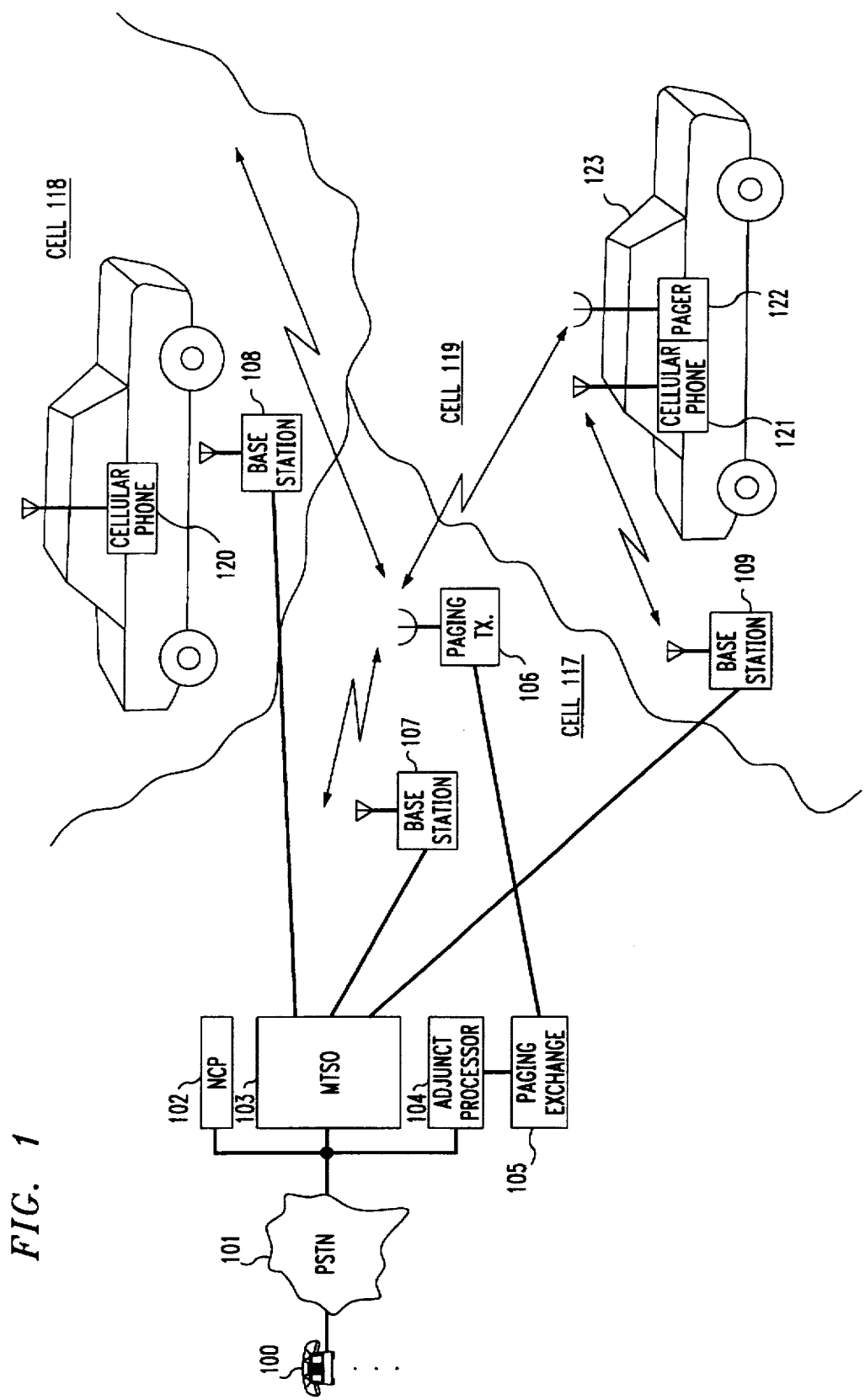
FIG. 1 is a block diagram of an illustrative telecommunications system that embodies an illustrative implementation of the invention.

FIG. 1 shows an illustrative telecommunications system. The telecommunications system comprises a cellular system, such as the AT&T Autoplex® system, that conventionally includes a mobile telephone system office (MTSO) 103 that serves as a wireless call exchange and provides wireless call processing and call routing services, a network control point (NCP) 102 that is connected to MTSO 103 and serves as a database of information about the configuration and present status of the cellular system, a plurality of base stations 107–109 connected to MTSO 103 and each providing wireless call services to cellular telephones 120–121 that are presently located in its cell 117–119, respectively. The telecommunications system of FIG. 1 further comprises a paging system that conventionally includes a paging exchange 105 that provides paging services to pagers, such as a pager 122, through at least one paging transmitter 106. The geographical area covered by a paging transmitter is typically large compared to the area of a cell, and encompasses a plurality of cells. The telecommunications system of FIG. 1 further comprises a landline telephone system that conventionally includes the public service telephone network (PSTN) 101 that interconnects a plurality of telephones, such as telephone 100. To provide call capability between landline telephones such as telephone 100 and cellular telephones 120–121, MTSO 103 is conventionally interconnected with PSTN 101.

Figure 3:
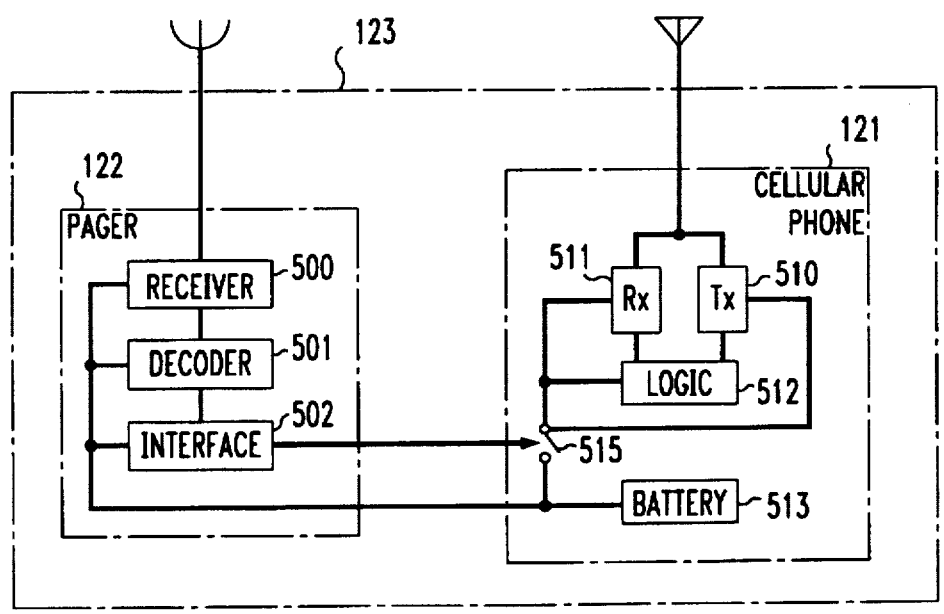
FIG. 3 is a block diagram of an integrated cellular radiotelephone and pager of the system of FIG. 1.

As described so far, the telecommunications system of FIG. 1 is conventional. According to the invention, however, at least some cellular system users, such as user 123, are equipped with a cellular telephone 121 and a pager 122 that are integrated into a single unit, as shown in FIG. 3. Cellular phone 121 is substantially conventional, but for the presence of a pager-controlled switch 315. Cellular phone 121 includes a transmitter 510 and a receiver 511 operating under control of cellular phone logic 512 and powered by a battery 513. Circuits 510–512 are connected to battery 513 through switch 315 which is controlled by pager 122. Pager 122 includes a conventional paging receiver 500 connected to a conventional paging decoder 501. According to the invention, pager 122 further includes interface circuitry 502 that operates switch 315 under control of decoder 501. Circuits 500–502 are illustratively powered by battery 513, and are always turned on. When decoder 501 decodes a received incoming-call indication, it not only alerts user 123 thereof but also causes interface circuitry 502 to close switch 315, thereby connecting circuits 510–512 to battery 513 and turning cellular phone 121 on. This causes cellular phone 121 to undergo registration and thus become able to receive the incoming call. And when decoder 501 decodes a received power turn-off indication, it causes interface circuitry 502 to open switch 315, thereby disconnecting circuits 510–512 from battery 513 and turning cellular phone 121 off, whereby cellular phone 121 again becomes unable to receive incoming calls.

Further according to the invention, the telecommunications system of FIG. 1 includes an adjunct processor 104 that is connected to MTSO 103, NCP 102, and paging exchange 105, and that provides for cellular-call completion with the aid of the paging system.

Figure 2:
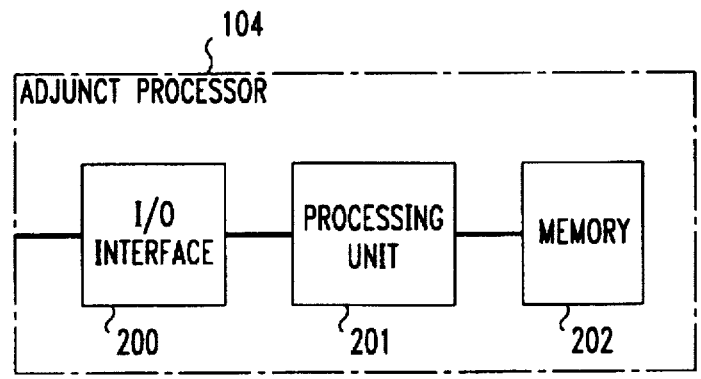
FIG. 2 is a block diagram of an adjunct processor of the system of FIG. 1.
Figure 4:
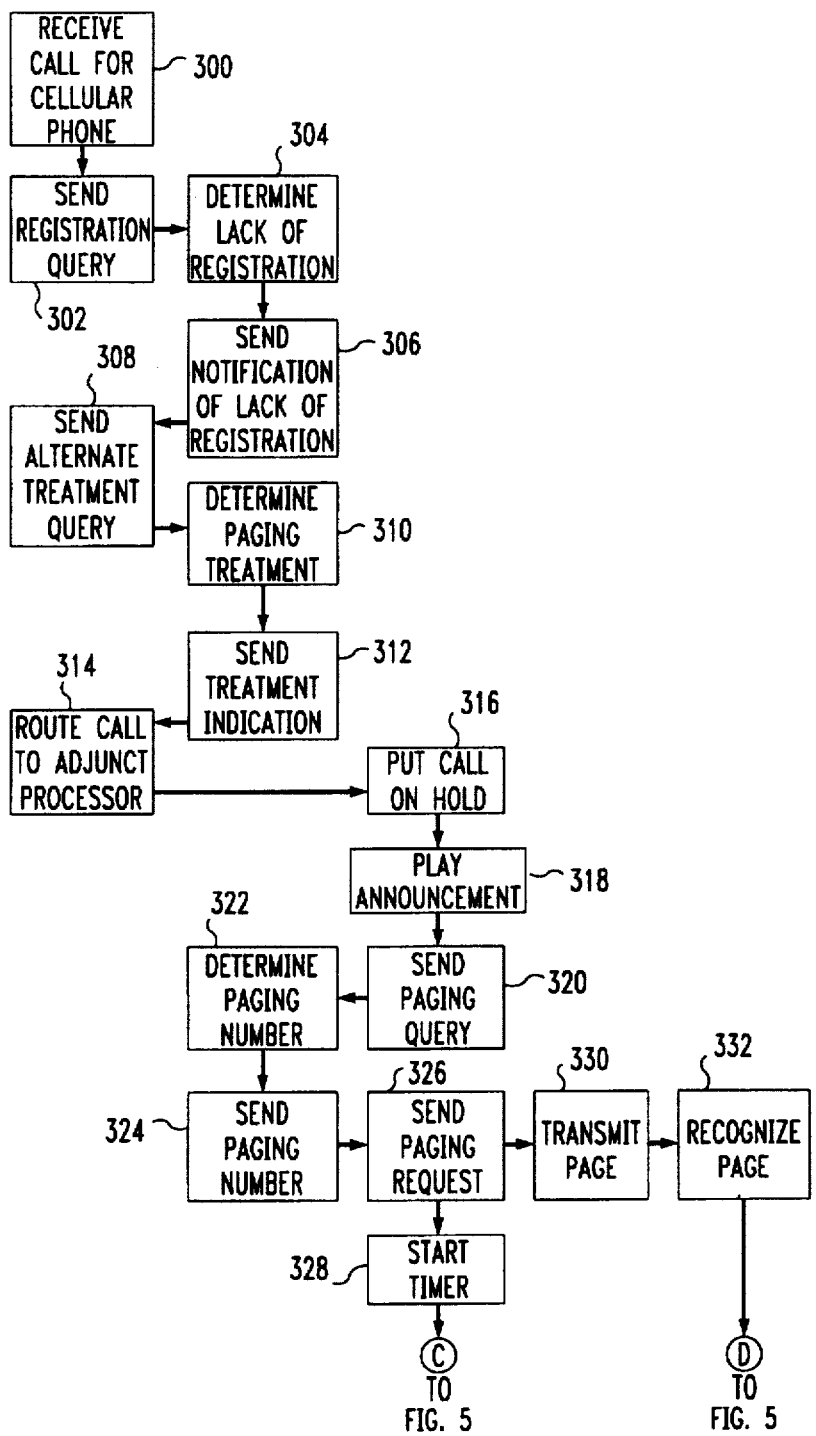
FIGS. 4–6 are a flow diagram of the operations of the system of FIG. 1.
Figure 5:
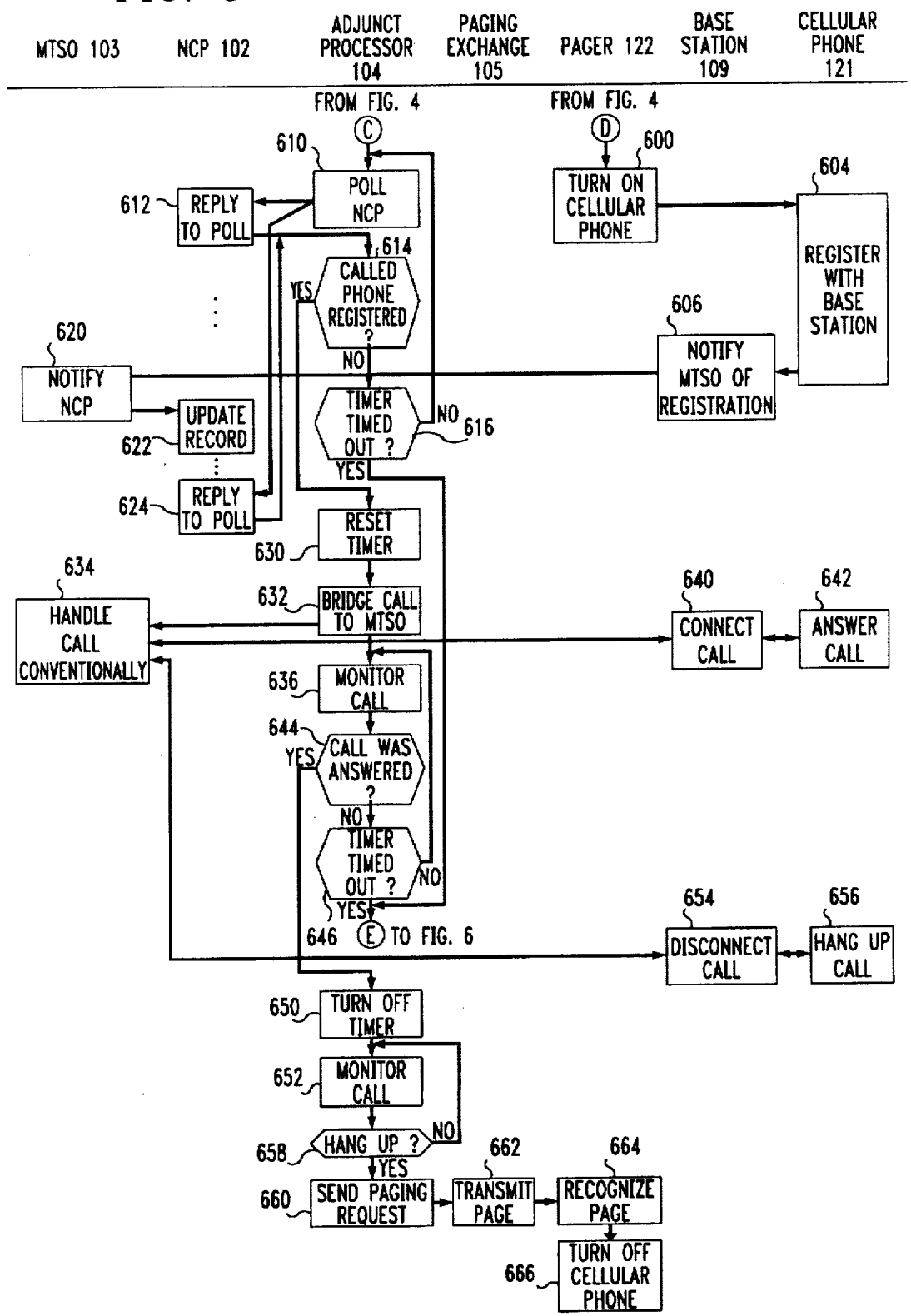
Figure 6:
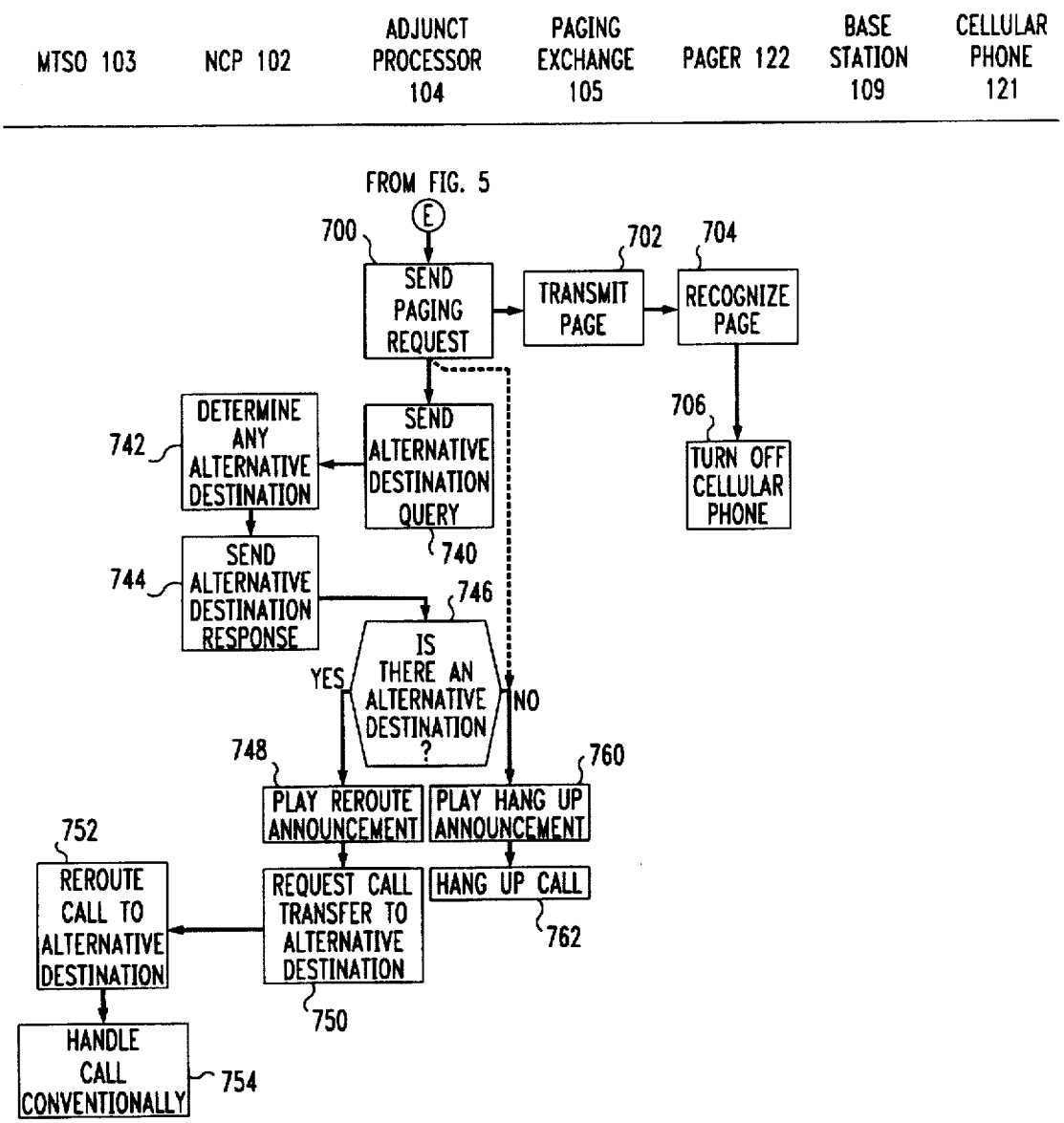

As shown in FIG. 2, adjunct processor 104 is a general-purpose stored-program controlled computer that includes a memory 202 for storing control programs, a processing unit 201 connected to memory 202 for executing the control programs, and an input and output (I/O) interface 200 for enabling processing unit 201 to communicate with MTSO 103, NCP 102, and paging exchange 105. Adjunct processor 104 is illustratively the AT&T Conversant® system. The control programs in memory 202 implement the adjunct-processor 104 functionality flowcharted in FIGS. 4–6. Alternatively, the control programs in memory 202 may be stored in and executed by MTSO 103, whereby MTSO 103 effects the functionality of adjunct processor 104 and adjunct processor 104 is not needed. FIGS. 4–6 show the operations of the entire telecommunications system of FIG. 1 that implement a first illustrative embodiment of the invention.

As shown in FIG. 4, when MTSO 103 receives a call incoming for a cellular phone 121, either from a landline telephone 100 via PSTN 101 or from another cellular phone 120, at step 300, it attempts to extend the call to cellular phone 121. First, MTSO 103 sends a query containing the called number to NCP 102, at step 302, to determine if the called cellular phone 121 is registered with any base station 107–109, and if so, which one. NCP 102 responds to the query by searching its data to determine if called cellular phone 121 is registered, at step 304. If called cellular phone 121 is registered, it is able to receive the incoming call. So NCP 102 conventionally sends the information back to MTSO 103 in a query response, and the MTSO conventionally extends the call to called cellular phone 121 via the one of the base stations with which cellular phone 121 is registered. However, if NCP 102 finds at step 304 that called cellular phone 121 is presently not registered with any base station, it is not able to receive the incoming call and the attempt at extending the call to cellular phone 121 cannot be completed, and NCP 102 notifies MTSO 103 thereof, at step 306. In response, MTSO 103 sends another query to NCP 102 inquiring whether alternative call treatment is being provided for this cellular phone 121, at step 308. Alternative treatment may include a call-coverage path, such as connecting the call to the called party's mailbox in a voice messaging system (not shown). According to the invention, the data in NCP 102 do provide for alternative call treatment for cellular phone 121, and the first alternative call destination in the coverage path of cellular phone 121 is specified to be adjunct processor 104. NCP 102 makes this determination, at step 310, and sends notice thereof to MTSO 103, at step 312. In response, MTSO 103 routes and connects the call to adjunct processor 104, at step 314. Adjunct processor 104 receives the call and puts it on hold, at step 316. While the call is on hold, adjunct processor 104 plays a pre-recorded announcement to the caller informing the caller to stay on the line while the called party is paged, at step 318. Adjunct processor 104 also sends a paging query for called cellular phone 121 to NCP 102, at step 320. NCP 102 finds the pager number of pager 122 that is associated with cellular phone 121 in its records for cellular phone 121, at step 322, and sends this pager number to adjunct processor 104, at step 324. In response, adjunct processor 104 sends a paging request to paging exchange 105, at step 326. The paging request contains the pager number of pager 122 and a request to send it an incoming-call indication. Adjunct processor 104 also starts a timer, at step 328, that gives cellular phone 121 a predetermined amount of time to become registered.

In response to the paging request, paging exchange 105 broadcasts an incoming-call-indicative paging signal containing the pager number provided by adjunct processor 104 and an incoming-call-indication code, at step 330. Pager 122 receives the paging signal and recognizes its pager number, at step 332, and in response it turns on cellular phone 121, at step 600 of FIG. 5. In response, cellular phone 121 automatically undergoes a conventional registration procedure with base station 109 that serves cell 119 in which cellular phone 121 is presently located, at step 604, and so becomes able to receive the incoming call. In response to the registration, base station 109 notifies MTSO 103 of the registration, at step 606, and MTSO 103 in turn notifies NCP 102, at step 620, causing NCP 102 to update its records for cellular phone 121 accordingly, at step 622.

In the meantime, adjunct processor 104 periodically polls NCP 102 for the status of cellular phone 121, at step 610. Until cellular phone 121 registers with a base station, NCP 102 replies to the poll with an indication that cellular phone 121 is not registered, at step 614. In response to the indication of non-registration, at step 614, adjunct processor 104 repeats polling of NCP 102 at step 610 until the timer that adjunct processor 104 had started at step 328 of FIG. 4 times out, at step 616. If cellular phone 121 registers with a base station and NCP 102 is informed thereof at step 622 before the timer times out at step 616, NCP 102 replies to a poll at step 610 with an indication that cellular phone 121 is registered and an identification of base station 109 with which cellular phone 121 is registered, at step 624. In response to this indication, at step 614, adjunct processor 104 resets the timer that it had started at step 328, at step 630. The timer now begins to time an interval during which cellular phone 121 must answer the call. Adjunct processor 104 also bridges the call back to MTSO 103, at step 632. This results in the call being connected back to MTSO 103 through adjunct processor 104, thereby allowing adjunct processor 104 to monitor the call, at step 636. MTSO 103 responds to the bridged call as if it had just received the call, and attempts to extend (i.e., connect) the call to cellular phone 121 in the conventional manner, at step 634, as if MTSO 103 had just received the call.

Adjunct processor 104 is monitoring the call, at step 636. If base station 109 connects the call to cellular phone 121 at step 640, and cellular phone 121 answers the call, at step 642, before the timer that adjunct processor 104 had reset at step 630 times out, at step 646, adjunct processor 104 detects the call answer, at step 644. In response, adjunct processor 104 turns off the timer, at step 650, and continues to monitor the call, at step 652. When one of the parties to the call hangs up the call, e.g., at step 656, and base station 109 proceeds to disconnect the call, at step 654, adjunct processor 104 detects this condition, at step 658. In response, adjunct processor 104 sends a power turn-off paging request for the pager number of pager 122 to paging exchange 105, at step 660. Paging exchange 105 responds by broadcasting the request via a paging signal, at step 662. Pager 122 receives and recognizes the paging signal, at step 664, and responds thereto by turning off cellular phone 121, at step 666.

If the timer that was started at step 328 of FIG. 4 times out before cellular phone 121 registers with a base station, at step 616, or if the timer that was reset at step 630 times out before adjunct processor 104 detects that cellular phone 121 answered the call, at step 646, adjunct processor 104 proceeds to step 700 of FIG. 6. At step 700, adjunct processor 104 sends a power turn-off paging request for the pager number of pager 122 to paging exchange 105. Paging exchange 105 responds by broadcasting the request via a paging signal, at step 702. Pager 122 receives and recognizes the paging signal, at step 704, and responds thereto by turning off cellular phone 121, at step 706. Adjunct processor 104 then sends an alternative destination query to NCP 102, at step 740. NCP 102 responds by checking the coverage path of cellular phone 121 to determine if any alternative destinations other than adjunct processor 104, are specified therein, at step 742, and informs adjunct processor 104 accordingly, at step 744. If there is an alternative destination specified for calls to cellular phone 121, as determined at step 746, adjunct processor 104 plays an announcement to the caller on the held call informing the caller that the called party could not be reached and that the call is being routed to an alternative destination, at step 748. Adjunct processor 104 then sends a request to MTSO 103 to transfer the call to the alternative destination, at step 750. MTSO 103 does so, at step 752, and continues to process the call in the conventional manner, at step 754.

Returning to step 746, if it is determined there that an alternative destination is not specified for calls to cellular phone 121, adjunct processor 104 plays an announcement to the caller on the held call informing the caller that the called party could not be reached and that the call is being terminated, at step 760. Adjunct processor 104 then hangs up the call, at step 762.

Alternatively, if the timer times out at step 616 or step 646, adjunct processor 104 may dispense with trying to find an alternative destination for the call and may proceed directly to steps 760 et seq., as indicated by the dashed line in FIG. 6.

Of course, various changes and modifications to the illustrative embodiments described above will be apparent to those skilled in the art. For example, the service may be extended to be used in conjunction with any device (e.g., fax machine, cellular modem) for the purpose of turning on and off and/or reprogramming the device via the paging network. Also, the service can be implemented in a cellular radiotelephone system without the need for a separate paging system, if the cellular system implements a paging-like capability (e.g., a "short message" capability). Such changes and modifications can be made without departing from the spirit and the scope of the invention and without diminishing its attendant advantages. It is therefore intended that such changes and modifications be covered by the following claims.

The invention claimed is:

1. An integrated wireless radiotelephone and pager comprising:

a wireless radiotelephone for receiving wireless calls that selectively receives power through a switch coupled to a battery; and a pager, coupled to the battery independent of the switch, the pager being operable to send a control signal that closes the switch in response to receipt by the pager of a first paging signal, thereby enabling the wireless radiotelephone to receive power and an incoming wireless call.

2. The integrated wireless radiotelephone and pager of claim 1, wherein:

the switch opens in response to receipt by the pager of a second paging signal, for disabling the wireless radiotelephone from receiving the wireless calls.

3. An integrated wireless radiotelephone and pager comprising:

a battery;

a wireless radiotelephone;

a pager; and means connected to the pager and to the wireless radio telephone, responsive to receipt by the pager of a first paging signal, for connecting the wireless radiotelephone to the battery;

wherein the pager is coupled to the battery independent of the connecting means.

4. The integrated wireless radiotelephone and pager of claim 3 wherein:

the connecting means are further responsive to receipt by the pager of a second paging signal, for disconnecting the wireless radiotelephone from the battery.

5. The integrated wireless radiotelephone and pager of claim 4 wherein:

the wireless radiotelephone is a cellular phone, and activation of the cellular phone causes the cellular phone to register with a base station of a cellular system.

6. The integrated wireless radiotelephone and pager comprising:

wireless radiotelephone circuitry;

paging circuitry; and a battery connected in parallel to the paging circuitry and to a pager-operated switch coupling the battery to the wireless radiotelephone circuitry;

wherein the pager-operated switch is responsive to receipt of a first paging signal by the paging circuitry for closing a connection between the battery and the wireless radiotelephone circuitry to activate the radiotelephone circuitry, and further responsive to receipt of a second paging signal by the paging circuitry for opening the connection between the battery and the wireless radiotelehone circuitry to deactivate the radiotelephone circuitry.

7. The integrated wireless radiotelephone and pager of claim 6 wherein:

the wireless radiotelephone circuitry comprises cellular phone circuitry, and activation of the cellular phone circuitry causes the cellular phone circuitry to register with a base station of a cellular system.

8. The integrated wireless radiotelephone and pager of claim 1, wherein:

the switch opens in response to receipt by the pager of a second paging signal indicating the incoming call has been disconnected or has not been received by the wireless radio telephone within a predetermined time period.

* * * * *